United States Patent
Estrada et al.

(10) Patent No.: US 7,797,384 B2
(45) Date of Patent: *Sep. 14, 2010

(54) SEQUENTIAL RESTRUCTURING OF A COLLABORATIVE CONTEXT

(75) Inventors: Miguel A. Estrada, Hollis, NH (US); Sami M. Shalabi, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/109,999

(22) Filed: Apr. 25, 2008

(65) Prior Publication Data

US 2008/0235598 A1    Sep. 25, 2008

(51) Int. Cl.
*G06F 15/16* (2006.01)
(52) U.S. Cl. ................................ 709/205; 715/753
(58) Field of Classification Search .............. 709/205, 709/203, 204, 206; 715/753
See application file for complete search history.

(56) References Cited

U.S. PATENT DOCUMENTS

| | | | | |
|---|---|---|---|---|
| 2002/0142279 | A1* | 10/2002 | Thean et al. | 434/350 |
| 2004/0254945 | A1* | 12/2004 | Schmidt et al. | 707/100 |

* cited by examiner

*Primary Examiner*—Krisna Lim
(74) *Attorney, Agent, or Firm*—Daniel McLoughlin, Esq.; Steven M. Greenberg, Esq.; Carey, Rodriguez, Greenberg & Paul, LLP

(57) ABSTRACT

The present invention is a method, system and apparatus for dynamically restructuring a named collaborative context. In a system for dynamically restructuring a named collaborative context, a named collaborative space having a composition of collaborators, roles, tools and resources can be coupled to a workflow engine. The workflow engine can be configured to process workflow templates. Restructuring logic further can be included in the system and can be programmed to rearrange the named collaborative space with a different composition responsive to a workflow step change specified by a workflow template for the named collaborative space and processed in the workflow engine. Notably, a portal view can be configured to provide a user interface to the named collaborative space. In this regard, the tools can include logical components embodied in a portlet disposed in the portal view.

9 Claims, 3 Drawing Sheets

SEQUENTIAL RESTRUCTURING OF A COLLABORATIVE CONTEXT

BACKGROUND OF THE INVENTION

1. Statement of the Technical Field

The present invention relates to the field of collaborative computing and more particularly to the configuration of a collaborative content.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include document libraries, instant messaging, chat rooms, and application sharing.

Conventional collaborative computing includes combinations of collaborative technologies in order to provide a means for members of a collaborative community to pool their strengths and experiences to achieve a common goal. For instance, a common goal can include an educational objective, the completion of a software development project or even the creation and use of a system to manage human resources. A collaborative computing environment generally can be defined by (1) a particular context, i.e. the objective of the environment, (2) membership, i.e., the participants in the environment, (3) a set of roles for the members, and (4) resources and tools which can be accessed by the membership in furtherance of the objective of the environment. Roles are names given to the people in the environment which dictate access to the resources and tools within the environment as well as define the behavior of the community members.

Collaborative computing environments typically can be customized by the developer of each environment in order to meet the needs both of developers and users. For instance, several customized collaborative computing environments have been created such as team workspaces, e-meetings, virtual classrooms and virtual communities. Notably, each of these types of environments has implemented using shared resources as a building block to create the environment. Nevertheless, customized collaborative computing environments can be rigid and immutable due to their customization.

Shared resources for all environments have general characteristics such as a purpose/title, and the premise that these environments can be created, deleted, cloned, renamed, expired, archived and restored. Shared resources may also be customized to fulfill the objectives of the environment. For example, virtual classrooms employ the general characteristics of the shared resources but further specialize the shared resources in the areas of defining membership roles, e.g., teacher, student, etc., the definition of content, e.g., courses, and provide a shared resource directory customized in the form of a list of courses.

Current customized collaborative computing environments must each be developed and configured individually, that is, each instance of a collaborative computing environment can only be of one customized type, e.g., a virtual classroom. As such, present systems require that each separate computing environment be developed from the ground up, even though the separate environments may have the need for common business processes, e.g., stock quotations, web conferencing interface, news, etc. Put another way, known collaborative computing systems do not provide a way to create an environment in which arbitrary business process objects can be placed and customized to fit the needs of the desired environment.

Importantly, collaboration cannot always be modeled as a static relationship between the membership, roles, resources and tools. Rather, in many cases, collaboration can involve a workflow. As is known in the art, workflow systems can include a sequence of steps required to meet a particular objective. In the collaborative computing context, so too can a collaborative objective include a sequence of steps. At each step, the membership, roles, resources and tools can change. Yet, the static nature of conventional collaborative systems cannot accommodate the notion of workflow so as to accurately produce a comfortable environment for achieving the collaborative objective of the collaborative system.

SUMMARY OF THE INVENTION

The present invention addresses the deficiencies of the art in respect to collaborative computing and provides a novel and non-obvious method, system and apparatus for dynamically restructuring a named collaborative context according to process steps enumerated in a workflow. In accordance with the present invention, a named collaborative space configured for workflow can include a default arrangement for the workflow. The default arrangement can specify a composition of collaborators in a membership, roles defined for the collaborators, and tools and resources configured for accessibility by the collaborators according to corresponding ones of the roles. The named collaborative space further can include at least one different arrangement defined for a different step in the workflow. The different arrangement can specify a different composition of the collaborators, roles, tools and resources. In this regard, responsive to a change in state for the named collaborative space, the different arrangement can supplant that default arrangement.

In a system for dynamically restructuring a named collaborative context, a named collaborative space having a composition of collaborators, roles, tools and resources can be coupled to a workflow engine. The workflow engine can be configured to process workflow templates. Restructuring logic further can be included in the system and can be programmed to rearrange the named collaborative space with a different composition responsive to a workflow step change specified by a workflow template for the named collaborative space and processed in the workflow engine. Notably, a portal view can be configured to provide a user interface to the named collaborative space. In this regard, the tools can include logical components embodied in a portlet disposed in the portal view.

A method for dynamically restructuring a named collaborative context can include composing a first arrangement of collaborators, roles, tools and resources in a named collaborative space. The first arrangement can be rendered in a user interface to permit collaborator interactions with the tools and resources. Subsequently, the named collaborative space can be monitored for changes in state. Responsive to a change in state in the named collaborative space, a second arrangement of collaborators, roles, tools and resources can be composed and rendered in place of the first arrangement. Additional changes in state in the named collaborative space can result in the composition of additional arrangements of collaborators, roles, tools and resources which can be rendered accordingly in the user interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for dynamically restructuring a named collaborative context according to process steps enumerated in a workflow. In particular, a dynamically customizable collaborative context can be provided. The dynamically customizable context, referred to herein as a named collaborative space, can include an arrangement of collaborators in a membership defined to pursue a common objective through the use of a collaborative computing environment. The named collaborative space further can include one or more logical components, referred to as collaborative tools, and one or more resources for use by the collaborators through the tools in the collaborative environment. Importantly, roles can be assigned to the collaborators which can limit or enhance access by the collaborators to different tools and resources in the named collaborative space.

The arrangement of collaborators, roles, tools and resources can be specified through a templating mechanism in which the arrangement can be defined in a template, named according to the common objective and processed at the time of creating the named collaborative space to produce the customized collaborative environment. Importantly, unlike the rigid nature of conventional customizable environments, in the named collaborative space of the present invention, any number and type of logical components can be included in the named collaborative space as specified by a template and rendered at run-time in order to produce a highly customizable and flexible collaborative computing environment.

In accordance with the present invention, the named collaborative space can be further extended to handle the changing requirements of a collaborative environment in the course of different states in a workflow. In this regard, a workflow can be defined for the collaborative environment which defines different arrangements of the collaborative components for different states of the workflow. A workflow engine can process the workflow according to the state of the named collaborative space in order to dynamically rearrange the combination of the collaborators in the membership, the respective roles for the membership, the tools deployed in the named collaborative space and the resources accessible for consumption in the named collaborative space.

Figure 1:
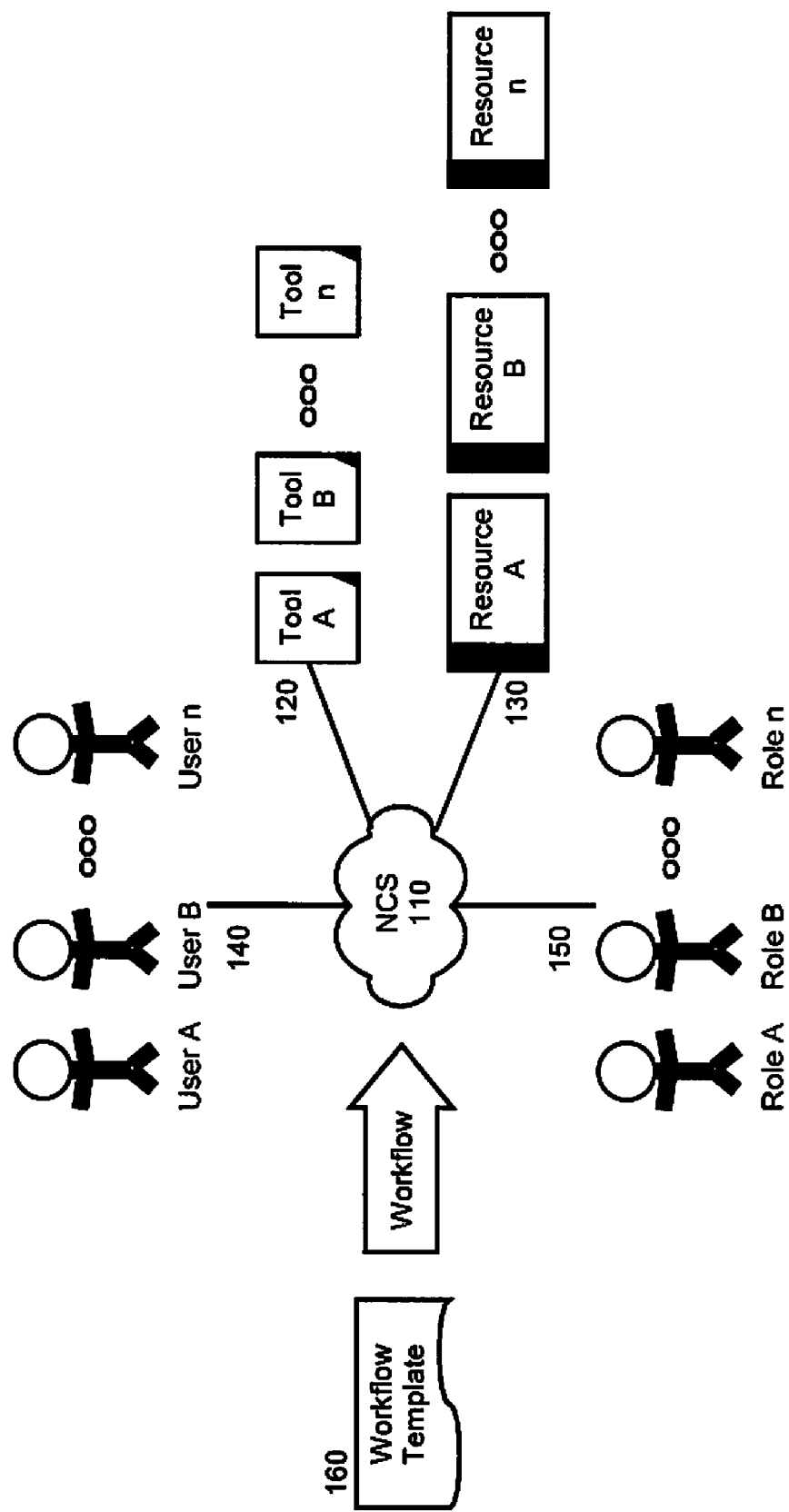
FIG. 1 is a pictorial illustration of a named collaborative space configured for workflow processing.

In further illustration of the general principle of the present invention, FIG. 1 is a pictorial illustration of a named collaborative space 110 configured for workflow processing. The named collaborative space 110 can include an arrangement of collaborators in a membership 140, roles 150 assigned to the collaborators in the membership 140, resources 130 which can be accessed and consumed by the collaborators in the membership 140, and logical components 120 referred to as tools which can be used by the collaborators in the membership 140 for the purpose of working towards the collaborative objective of the named collaborative space 110.

The collaborators in the membership 140 can be computing users defined within a directory structure. The collaborators in the membership 140 can be associated with one or more roles 150. Each of the roles 150 can include permissions associated with collaborators in the membership 140 assigned to the role. The permissions can include which of the tools 120 can be accessed by the collaborators assigned to a specific one of the roles 150, and the extent to which the collaborators in the role can access the tools 120. The roles 150 also can limit which of the resources 130 can be accessed and consumed by the collaborators assigned to the roles 150.

The tools 120 in the named collaborative space 110 can include logical processes, such as self-contained computing applications, servlets, or portlets, which can be formed from a single set of computing logic, or from a composition of multiple sets of computing logic. The tools 120 can include both conventional business logic, as well as other logic, for instance logic for managing the membership 140, the roles 150, and the resources 130. In any case, in a preferred aspect of the present invention, the named collaborative space 110 can be implemented within a portal environment in which the tools 120 can be portlet representations dynamically aggregated within the portal environment. To that end, a template defining the named collaborative space 110 can be processed in the portal aggregator to establish the specified arrangement of tools within the portal view.

According to the present invention, a workflow template 160 can be defined for a collaborative workflow. The workflow template 160 specifically can define an arrangement of collaborators in the membership 140, roles 150, tools 120 and resources 130 for each step of the workflow for reaching the collaborative objective. In this regard, the initial arrangement of collaborators in the membership 140, roles 150, tools 120 and resources 130 can be specified by the workflow template 160 as an initial default state. As the state of the named collaborative space changes, so too can the arrangement. In particular, when a state change occurs, the workflow template 160 can be consulted to identify a next arrangement required by the workflow. Subsequently, the arrangement of the collaborators in the membership 140, roles 150, tools 120 and resources 130 can change to accommodate the next step in the workflow.

Figure 2:
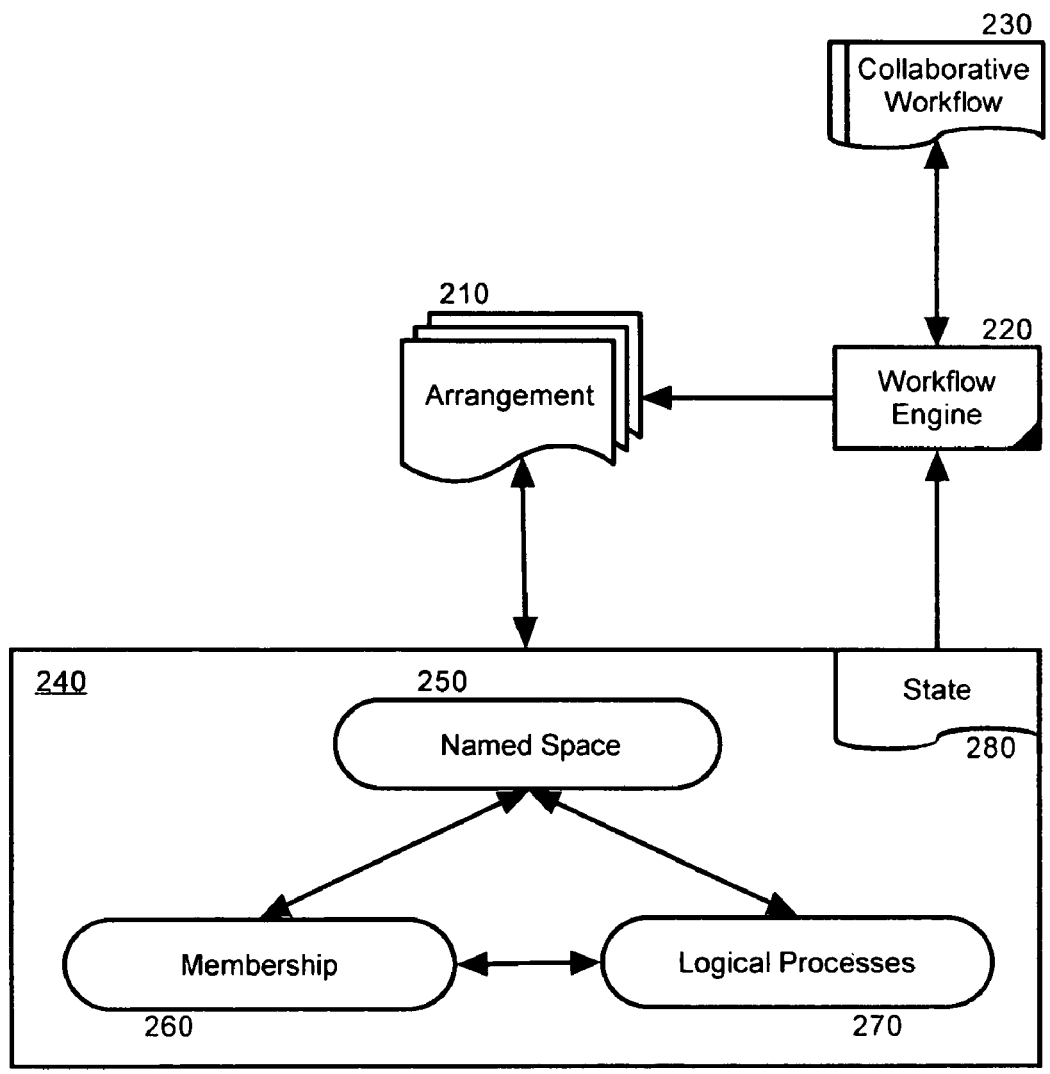
FIG. 2 is a schematic illustration of a system for processing workflow in a named collaborative space; and, FIG. 3 is a flow chart illustrating a process for handling workflow in a named collaborative space in the system of FIG. 2.

To facilitate the fluid nature of the named collaborative space according to a defined workflow, a system for processing workflow in a named collaborative space can be defined. In illustration, FIG. 2 is a schematic drawing of a system for processing workflow in a named collaborative space. The system can include a named collaborative space 240 including a membership 260 and corresponding logical processes 270 arranged according to an templated one of the arrangements 210 to pursue the common objective defined as a named space 250. The named collaborative space can include a state 280 corresponding to a point within a collaborative workflow presently enjoyed by the membership 260 of the named collaborative space 240.

A workflow engine 220 can be configured to process a specification of a workflow 230 for the collaboration of the named collaborative space 240. Specifically, the workflow 230 can describe different ones of the arrangements 210 corresponding to the different steps of the workflow 230. As the state 280 of the named collaborative space 240 changes, the workflow engine 220 can compare the state 280 of the named collaborative space 240 to the steps of the workflow 230. Subsequently, a new one of the arrangements 210 can be identified for the changed state 280 and the new one of the arrangements 210 can be applied to the named collaborative space 240 in order to change the structure of the named collaborative space 240 to accommodate the new step within the workflow 230.

Figure 3:
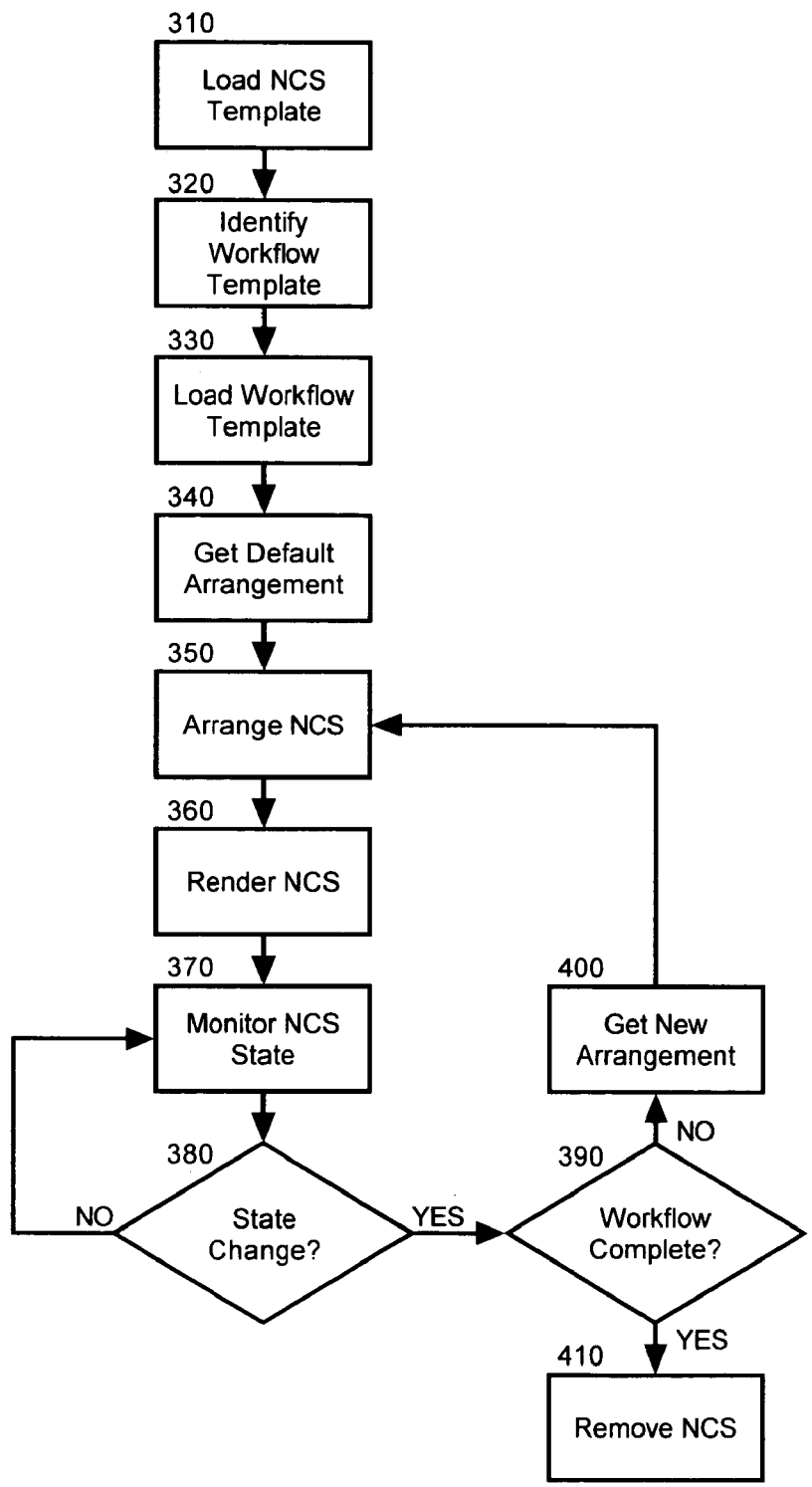

To better explain the methodology of handling workflow steps in the system of FIG. 2, FIG. 3 is a flow chart illustrating a process for handling workflow in a named collaborative space. Beginning in block 310, a template for a named collaborative space can be loaded. In block 320, a workflow associated with the named collaborative space can be identified within the template. In block 330 the workflow template can be loaded for processing and in block 340, a default arrangement for collaborators, roles, tools and resources can be retrieved. In block 350, the default arrangement can be applied to the named collaborative space and in block 360 the named collaborative space can be rendered for interoperation among the collaborators.

In block 370 the state of the named collaborative state can be monitored for state changes. In decision block 380, a state change can be detected and in decision block 390, it can be determined if, in consequence of the state change, the workflow for the named collaborative space has completed. If not, in block 400 a new arrangement for the named collaborative space can be retrieved based upon the workflow template. Subsequently, in block 350 the default arrangement can be applied to the named collaborative space and in block 360 the named collaborative space can be re-rendered for continued interoperation among the new collaborators specified by the new arrangement. The process can continue until the workflow has completed in consequence of which the named collaborative space can be removed in block 410.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A named collaborative space configured for workflow, the named collaborative space comprising:
    a workflow engine executing in memory by a processor of a computer;
    a workflow processed in the workflow engine, the workflow describing different arrangements corresponding to the different steps of the workflow, each of the arrangements specifying a composition of collaborators in a membership, roles defined for said collaborators, and tools and resources configured for accessibility by said collaborators according to corresponding ones of said roles;
    a default arrangement for the workflow selected from amongst the different arrangements, said default arrangement specifying a composition of collaborators in a membership, roles defined for said collaborators, and tools and resources configured for accessibility by said collaborators according to corresponding ones of said roles; and,
    at least one different arrangement amongst the different arrangements defined for a different step in the workflow and responsive to a change in state for the named collaborative space, said at least one different arrangement specifying a different composition of said collaborators, roles, tools and resources.

2. The named collaborative space of claim 1, wherein said default arrangement and said at least one different arrangement are configured to be rendered through a portal view.

3. A system for dynamically restructuring a named collaborative context, the system comprising:
    a named collaborative space comprising a composition of collaborators, roles, tools and resources;
    a workflow engine coupled to said named collaborative space and configured to process workflow templates; and,
    restructuring logic programmed to rearrange said named collaborative space with a different composition responsive to a workflow step change specified by a workflow template for said named collaborative space and processed in said workflow engine.

4. The system of claim 3, further comprising a portal view configured to provide a user interface to said named collaborative space.

5. The system of claim 4, wherein said tools comprise logical components embodied in a portlet disposed in said portal view.

6. A non-transitory machine readable storage having stored thereon a computer program for dynamically restructuring a named collaborative context, the computer program comprising a routine set of instructions which when executed by a machine causes the machine to perform the steps of:
    composing a first arrangement of collaborators, roles, tools and resources in a named collaborative space; rendering said first arrangement in a user interface to permit collaborator interactions with said tools and resources;
    monitoring said named collaborative space for changes in state; and, responsive to a change in state in said named collaborative space, composing a second arrangement of collaborators, roles, tools and resources and rendering said second arrangement in place of said first arrangement.

7. The non-transitory machine readable storage of claim 6, wherein said step of composing a second arrangement comprises the step of consulting a workflow template with respect to said state in said named collaborative space to identify said second arrangement.

8. The non-transitory machine readable storage of claim 6, wherein said rendering step comprises the step of aggregating a portal view according to said first arrangement, and wherein said re-rendering step comprises the step of aggregating a different portal view according to said second arrangement.

9. The non-transitory machine readable storage of claim 6, further comprising the step of responsive to an additional change in state in said named collaborative space, composing an additional arrangement of collaborators, roles, tools and resources and rendering said additional arrangement.

* * * * *